United States Patent [19]

Horner

[11] Patent Number: 4,742,602

[45] Date of Patent: May 10, 1988

[54] TARPAULIN SECURING ASSEMBLY

[76] Inventor: James W. Horner, P.O. Box 821, Shelby, Mont. 59474

[21] Appl. No.: 102,483

[22] Filed: Sep. 29, 1987

[51] Int. Cl.$^4$ .................... E04H 15/64; F16G 11/00
[52] U.S. Cl. ................. 24/115 K; 24/115 H; 135/119
[58] Field of Search ............ 24/115 K, 115 H, 115 R, 24/459; 135/119

[56] References Cited

U.S. PATENT DOCUMENTS

| | | | |
|---|---|---|---|
| 2,772,684 | 12/1956 | Puls et al. | 135/119 |
| 3,225,408 | 12/1965 | Durham | 135/119 |
| 3,328,854 | 7/1967 | Tombari | 135/119 |
| 4,619,094 | 10/1986 | Yang | 135/119 |

Primary Examiner—Victor N. Sakran
Attorney, Agent, or Firm—Arthur L. Urban

[57] ABSTRACT

A tarpaulin securing assembly includes a first surface contacting portion, a second surface contacting portion, a securing portion and a connecting portion. The first and second surface contacting portions include enlarged planar sections with axially aligned central openings disposed in substantially continuous contact with opposite major surfaces of the tarpaulin. The securing portion includes first and second rotatable fastening members operatively connected to the respective planar section extending outwardly from an exposed major surface and being axially aligned with the central openings thereof. A threaded finger member extends from the first fastening member through the planar section central openings. The second fastening member includes a threaded central passage therethrough axially aligned with the openings engageable with the threaded finger member. At least one of the fastening members includes a transverse passage therethrough substantially perpendicular to the axis of the central openings. The connecting portion includes a bail member pivotally engageable with the transverse passage including an elongated first end section extending completely through the transverse passage with a second end section secured thereto.

11 Claims, 1 Drawing Sheet

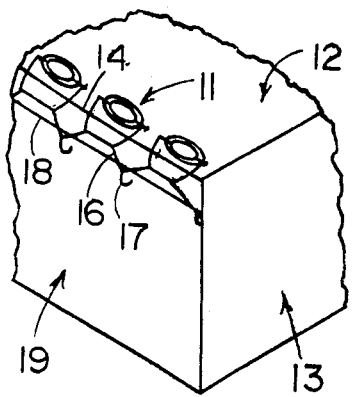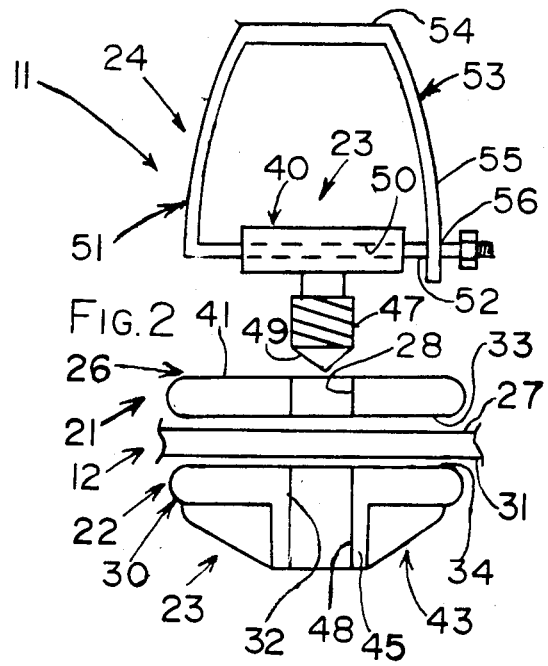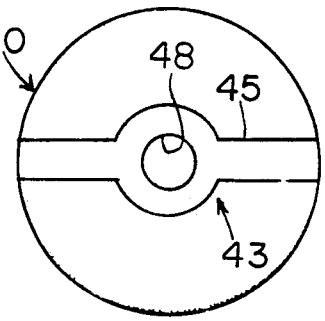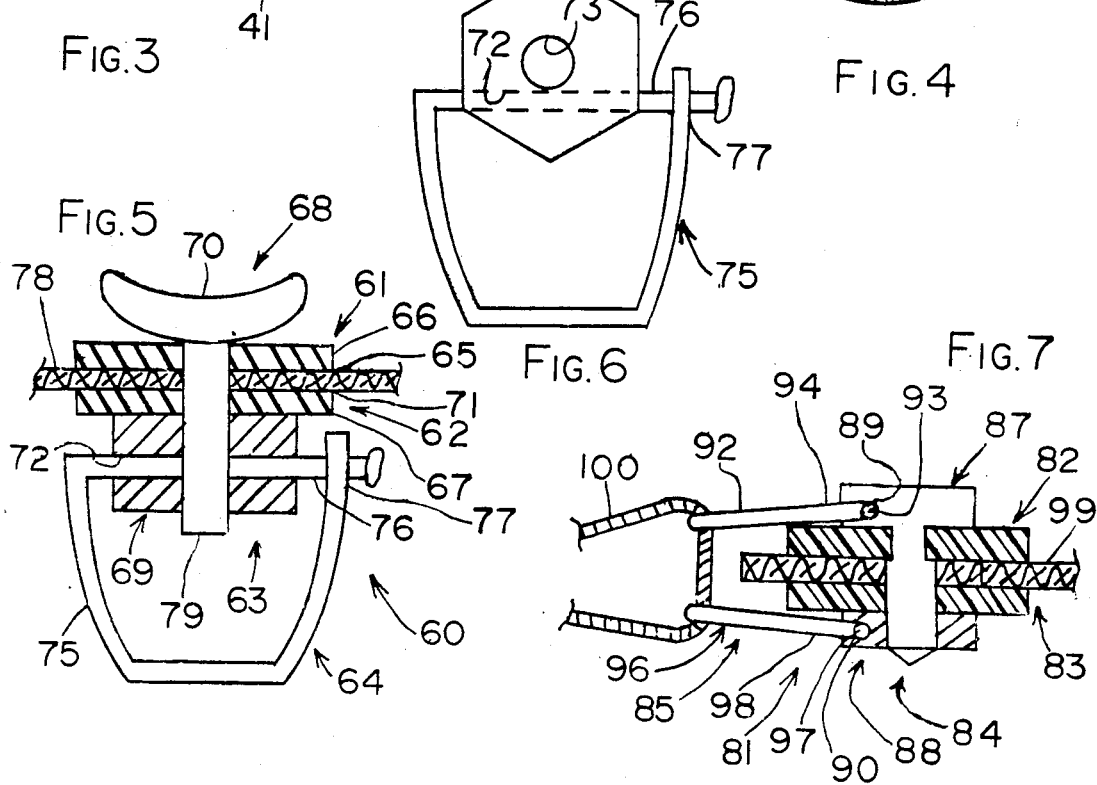

TARPAULIN SECURING ASSEMBLY

This invention relates to a novel securing means and more particularly relates to a new tarpaulin securing assembly.

In the past, people using tarpaulins normally employed covers that included a plurality of grommets spaced around the peripheral edges of the tarp. Lead lines or ropes tied to or laced through the grommets and interconnected with anchors held the tarp in place. While such covers were useful where materials or cargo being protected was of a configuration approximating that of the cover, in situations in which the materials had a significantly different configuration, the results were less satisfactory.

When the materials did not fill the area under the cover, tying the tarp down using lead lines interconnected with the grommets frequently created pockets under the tarp. These pockets provided access for the wind to get under the tarp, causing it to flap. When the wind became stronger, the increased severity of the flapping could break the lead lines, tear the grommets from the tarp or do other damage thereto.

In an attempt to avoid such problems, people have tried a variety of expedients. Some individuals have used extra ropes to crisscross the tarp and supplement the grommet tie downs. The success of this method will depend on the shape of the material under the tarp and the care with which the extra ropes are installed. In any case, however, the procedure requires extra time and labor and more ropes.

A more common solution is simply to cut holes in a tarp for attachment of lead lines that will be more properly located for a secure tie down. This method also requires extra time and labor. In addition, the holes may create weak points in the tarp that will increase the possibility of future damage to the tarpaulin.

From the above discussion, it is clear that users are faced with tarpaulin tie down procedures that may not provide desirable solutions in a large number of installations. Thus, there is a need for a new method and product that overcomes the shortcomings of previous methods.

The present invention provides a novel tarpaulin securing assembly that not only overcomes the deficiencies of earlier tarpaulin tie down methods, but also provides features and advantages not found in previous tie down methods. The securing assembly of the present invention permits a secure tie down of a tarpaulin to be achieved irrespective of the size and shape of the material being covered. Through the use of the securing assembly of the invention, such secure tie downs can be formed with covers that do not include edge grommets.

The tarpaulin securing assembly of the present invention is simple in design and can be produced relatively inexpensively. Commercially available materials and components can be utilized in the fabrication thereof. Conventional industrial techniques and procedures can be employed by semi-skilled labor in the manufacture of the product.

The securing assembly of the present invention can be installed at any desired points on the surface of a tarpaulin easily and quickly. Persons of all ages including those with limited strength such as the elderly and youngsters can install the securing assembly of the invention efficiently after a minimum of instruction.

The securing assembly of the invention does not create weak points in the surface of the tarpaulin or other cover. The design of the assembly actually creates a point of reinforcement. The securing assembly can be modified conveniently for particular applications or requirements. The securing assembly can be installed easily on covers already at hand and/or in use with or without grommets.

Other benefits and advantages of the novel tarpaulin securing assembly of the present invention will be apparent from the following description and the accompanying drawings in which:

FIG. 1 is a view in perspective of one form of securing assembly of the invention installed on a tarpaulin in use;

FIG. 2 is an enlarged side view of the tarpaulin securing assembly shown in FIG. 1 with components separated;

FIG. 3 is a top view of a first surface contacting portion of the tarpaulin securing assembly shown in FIGS. 1 and 2;

FIG. 4 is a bottom view of a second surface contacting portion of the tarpaulin securing assembly shown in FIGS. 1 and 2;

FIG. 5 is a side view in section of another form of tarpaulin securing assembly of the invention;

FIG. 6 is a bottom view of the first surface contacting portion of the tarpaulin securing assembly shown in FIG. 5; and FIG. 7 is a side view partially in section of a further form of tarpaulin securing assembly of the invention.

As shown in FIGS. 1-4 of the drawings, one form of tarpaulin securing assembly 11 of the present invention is installed on a tarpaulin 12 covering a bin such as a truck body 13. The tarpaulin 12 is tied down by by installing a plurality of spaced securing assemblies 11 along an edge 14 of the tarpaulin 12. A lead line such as rope 16 is interlaced between the securing assemblies and spaced anchors such as hooks 17 located along an upper edge 18 of one side wall 19 of the truck body 13.

The tarpaulin securing assembly 11 of the present invention includes a first surface contacting portion 21, a second surface contacting portion 22, a securing portion 23 and a connecting portion 24.

The first surface contacting portion 21 of the tarpaulin securing assembly of the invention includes a first enlarged planar section 26. The planar section is disposed in substantially continuous contact with one major surface 27 of the tarpaulin 12. The first planar section 26 includes a first central opening 28 therethrough.

The second surface contacting portion 22 of the securing assembly 11 includes a second enlarged planar section 30. The second planar section is disposed in substantially continuous contact with an opposite major surface 31 of the tarpaulin 12. The second planar section 30 includes a second central opening 32 therethrough. The central openings 28 and 32 of the first and second planar sections 26 and 30 respectively are axially aligned.

Advantageously, the first and second planar sections 26 and 30 have the same general configuration and preferably have configurations symmetrical about the central openings. The planar sections advantageously are formed of a resilient material such as plastic, rubber and the like. The planar sections preferably include a frictional surface 33 and 34 in contact with the major surfaces 27 and 31 of the tarpaulin 12.

The securing portion 23 of the tarpaulin securing assembly 11 of the present invention includes a first rotatable fastening member 40. The first fastening member 40 is operatively connected with the first planar section 26. Advantageously, the first fastening member is rotatable with respect to the first planar section. The first fastening member extends outwardly from an exposed major surface 41 of the first planar section. The first fastening member is axially aligned with the central opening 28.

The securing portion 23 also includes a second rotatable fastening member 43. The second fastening member is operatively connected with the second planar section 30. The second fastening member 43 extends outwardly from an exposed major surface of the second planar section 30. The second fastening member is axially aligned with the central opening 32 of the second planar section.

One of the fastening members advantageously includes gripping means, preferably wing extensions. As shown in FIGS. 2 and 4, the second fastening member 43 is a wing nut 45. Advantageously, the second fastening member is integrally formed with the second planar section, as shown.

The securing portion 23 of the assembly 11 further includes a threaded finger member 47. The finger member 47 extends from the first fastening member 40 through the central openings 28 and 32 of the first and second planar sections 26 and 30. The second fastening member 43 includes a threaded central passage 48 therethrough that is axially aligned with the first and second openings 28 and 32. The threaded central passage 48 is engageable with the threaded finger member 47 of the first fastening member 40. The finger member preferably includes a tapered end section 49 to facilitate puncture of the tarpaulin.

At least one of the fastening members 40 or 43 includes a transverse passage 50 therethrough. The passage 50 is substantially perpendicular to an axis of the central openings 28 and 32 of the first and second planar sections.

The connecting portion 24 of the tarpaulin securing apparatus 11 of the invention includes a bail member 51. The bail member 51 is pivotally engageable with the transverse passage 50 through the fastening member shown as first fastening member 40 of assembly 11.

The bail member 51 includes an elongated first end section 52. The first end section 52 extends completely through the transverse passage 50 of the first fastening member. The bail member also includes a generally U-shaped intermediate section 53 with a central part 54 thereof. The central part 54 which is remote from the first fastening member 40 is disposed substantially parallel to the first end section 52 of the bail member. A second end section 55 of the bail member includes a free end 56 secured to the first end section 52 that extends from the transverse passage 50.

In the use of the tarpaulin securing assembly 11 of the present invention as described above and shown in FIGS. 1–4 of the drawings, a plurality of assemblies first are installed at the desired points on the surface of the tarpaulin. These points can be selected after a tarp has been placed over the material or cargo being covered and the loose areas of the tarp are observed.

At each selected point, a first fastening member 40 with a first surface contacting planar section 26 disposed on the finger member 47 is placed over the selected point with the free end 49 of the finger member against the tarp surface 27. Pressure on the outer end of the fastening member 40 forces the tapered end section through the tarp.

With the free end of the finger member protruding from the tarp surface 31, the central opening 32 of a second planar section 30 is placed over the finger end and pushed into contact with the opposite major surface 31 of the tarpaulin. Next, a second fastening member 43 is threaded onto the finger member and tightened thereon. In the same way, additional securing assemblies 11 are installed on the tarpaulin 12.

To secure the tarpaulin, one or more tie down ropes 16 are interlaced with or otherwise attached to the bail members 51 of the respective securing assemblies 11. The tie downs then are interconnected with adjacent anchors such as hooks 17 located on surfaces such as truck body sidewall 19. The length of the respective rope or ropes therafter is adjusted to create tension in the ropes and thereby tension in the tarpaulin.

FIGS. 5 and 6 of the drawings illustrate another form of tarpaulin securing assembly 60 of the present invention. The assembly 60 includes a first surface contacting portion 61, a second surface contacting portion 62, a securing portion 63 and a connecting portion 64. The first and second surface contacting portions 61 and 62 are similar to the respective surface contacting portions 21 and 22 of securing assembly 11 described above. The contacting portions 61 and 62 include enlarged planar sections 66 and 67 respectively with frictional surfaces 65 and 71.

The securing portion 63 of the assembly 60 includes a first fastening member 68 and a second fastening member 69. These fastening members differ from the fastening members 40 and 43 of assembly 11 described above in that the first fastening member 68 includes gripping means 70. Also, the second fastening member 69 includes a transverse passage 72 alongside the threaded central passage 73. A bail member 75 mounted therein includes an end section 76 that extends completely through the transverse passage 72 and is attached to an opposite bail end section 77.

The securing assembly 60 is installed on a tarpaulin 78 in the same way as assembly 11 is installed on tarpaulin 12. The securing assembly 60 may provide a different installation, e.g. connecting the tie down line below an outer surface of the tarp or an installation in which finger member 79 can extend outwardly from a tarp.

FIG. 7 of the drawings illustrates a further form of tarpaulin securing assembly 81 of the invention. The assembly 81 includes a first surface contacting portion 82, a second surface contacting portion 83, a securing portion 84 and a connecting portion 85. The assembly 81 differs from the securing assemblies 11 and 60 described above in that first and second fastening members 87 and 88 each include a transverse passage 89 and 90 respectively with bail members mounted therein. Bail member 92 includes an end section 93 that extends completely through passage 89 and is attached to opposite bail end 94. Bail member 96 includes an end section 97 that extends completely through passage 90 and is attached to opposite bail end 98.

The securing assembly 81 is installed on a tarp 99 in the same way as the assemblies 11 and 60 described above. A tie down line or rope 100 may be passed through both bail members 92 and 96 to exert a pull on a tarp edge along a major plane of the tarpaulin.

The tarpaulin securing assembly of the present invention may be fabricated from a variety of materials employed with commercial fasteners such as metals, plastics, combinations thereof and the like. The particular materials selected will depend upon the life expected and the severity of service contemplated.

The above description and the accompanying drawings show that the present invention provides a novel tarpaulin assembly that overcomes the deficiencies of earlier devices and methods. In addition, the assembly provides features and advantages not found in previous products. The securing assembly of the invention enables a tarpaulin to be anchored securely irrespective of the size and shape of the material being covered. Also, the securing assembly provides flexibility of the tie down to accommodate a wide variety of different materials.

The tarpaulin securing assembly of the invention is simple in design and can be produced relatively inexpensively from commercially available materials and components employing conventional fabrication procedures and semi-skilled labor. The assembly is durable in construction and has a long useful life.

The securing assembly of the invention can be installed at any desired points on the surface of a tarpaulin simply and quickly by persons of all ages and experience. The assemblies can be shifted from one point on a tarpaulin to another and/or transferred easily between tarpaulins.

It will be apparent that various modifications can be made in the particular securing assembly described in detail above and shown in the drawings within the scope of the present invention. The size, configuration and arrangement of components can be changed to meet specific requirements. The surface contacting portions can be different. Other means can be utilized to connect the end sections of the bail member, e.g., fasteners, welding, interlocking, etc. These and other changes can be made in the tarpaulin securing assembly provided the functioning and operation thereof are not adversely affected. Therefore, the scope of the present invention is to be limited only by the following claims.

What is claimed is:

1. A tarpaulin securing assembly including a first surface contacting portion, a second surface contacting portion, a securing portion and a connecting portion; said first surface contacting portion including a first enlarged planar section disposed in substantially continuous contact with one major surface of a tarpaulin, said planar section including a central opening therethrough; said second surface contacting portion including a second enlarged planar section disposed in substantially continuous contact with an opposite major surface of said tarpaulin, said second planar section including a central opening therethrough, said central openings of said first and second planar sections being axially aligned; said securing portion including a first rotatable fastening member operatively connected with said first planar section, said first fastening member extending outwardly from an exposed major surface of said first planar section and being axially aligned with said central opening thereof, a second rotatable fastening member operatively connected with said second planar section, said second fastening member extending outwardly from an exposed major surface of said second planar section and being axially aligned with said central opening thereof, a threaded finger member extending from said first fastening member through said central openings of said first and second planar sections, said second fastening member including a threaded central passage therethrough axially aligned with said first and second openings, said threaded central passage being engageable with said threaded finger member of said first end member, at least one of said fastening members including a transverse passage therethrough substantially perpendicular to said axis of said central openings of said planar sections; said connecting portion including a bail member pivotally engageable with said transverse passage through said fastening member, said bail member including an elongated first end section extending completely through said transverse passage, a generally U-shaped intermediate section with a central part thereof remote from said first fastening member disposed substantially parallel to said first end section, and a second end section including a free end secured to a free end of said first end section that extends from said transverse passage; whereby a tarpaulin can be secured through bail members of securing assemblies spaced around the periphery of said tarpaulin.

2. A tarpaulin securing assembly according to claim 1 wherein said first and second planar sections have the same general configuration.

3. A tarpaulin securing assembly according to claim 1 wherein said first and second planar sections have configurations symmetrical about said central openings.

4. A tarpaulin securing assembly according to claim 1 wherein said first and second planar sections are formed of a resilient material.

5. A tarpaulin securing assembly according to claim 1 wherein said first and second planar sections include frictional surfaces in contact with said major surfaces of said tarpaulin.

6. A tarpaulin securing assembly according to claim 1 wherein said first fastening member is rotatable with respect to said first planar section.

7. A tarpaulin securing assembly according to claim 1 wherein one of said fastening members includes gripping means.

8. A tarpaulin securing assembly according to claim 7 wherein said gripping means includes wing extensions.

9. A tarpaulin securing assembly according to claim 1 wherein said second fastening member is integrally formed with said second planar section.

10. A tarpaulin securing assembly according to claim 1 wherein said first and second fastening members each include a transverse passage with a bail member mounted therein.

11. A tarpaulin securing assembly according to claim 1 wherein said finger member includes a tapered end section.

* * * * *